United States Patent
Aeschlimann et al.

(10) Patent No.: US 6,913,666 B1
(45) Date of Patent: Jul. 5, 2005

(54) PROCESS FOR ANCHORING CONNECTING ELEMENTS IN A MATERIAL WITH PORES OR CAVITIES AND CONNECTING ELEMENTS THEREFOR

(75) Inventors: Marcel Aeschlimann, Biel (CH); Elmar Mock, Biel (CH); Laurent Torriani, Biel (CH); Heinz Koester, Stefankirchen (DE)

(73) Assignee: Woodwelding AG, Zurich (CH)

(*) Notice: Subject to any disclaimer, the term of this patent is extended or adjusted under 35 U.S.C. 154(b) by 0 days.

(21) Appl. No.: 09/381,526

(22) PCT Filed: Mar. 19, 1998

(86) PCT No.: PCT/CH98/00109

§ 371 (c)(1),
(2), (4) Date: Apr. 12, 2000

(87) PCT Pub. No.: WO98/42988

PCT Pub. Date: Oct. 1, 1998

(30) Foreign Application Priority Data

Mar. 21, 1997 (CH) .............................. 679/97

(51) Int. Cl.$^7$ ............................ B32B 31/20; B32B 7/08
(52) U.S. Cl. ...................... 156/73.1; 156/73.6; 156/92; 156/303.1; 156/306.6; 156/309.6; 411/501; 411/506; 411/900; 411/908
(58) Field of Search .............................. 156/92, 303.1, 156/306.6, 309.6, 73.2, 221, 91, 917, 73.1, 73.5, 73.6, 293; 428/223; 411/500, 501, 506, 507, 900, 901, 908; 144/355; 52/701; 403/266, 296; 24/706, 711.4, 703.1, DIG. 11

(56) References Cited

U.S. PATENT DOCUMENTS

| | | | | |
|---|---|---|---|---|
| 772,029 A | * | 10/1904 | Clark .......................... | 411/501 |
| 2,366,274 A | * | 1/1945 | Luth et al. .................. | 428/223 |
| 2,458,152 A | * | 1/1949 | Edkins ........................ | 156/92 |
| 2,510,693 A | * | 6/1950 | Green ......................... | 411/501 |
| 2,942,748 A | * | 6/1960 | Anderson .................... | 156/294 |
| 3,184,353 A | | 5/1965 | Balamuth et al. | |

(Continued)

FOREIGN PATENT DOCUMENTS

| | | |
|---|---|---|
| DD | 257797 | 2/1987 |
| DE | 2418198 | 4/1974 |

(Continued)

OTHER PUBLICATIONS

Reader's Digest Complete Do–it–yourself Manual, Reader's Digest Association, (1985), p. 69.*

(Continued)

*Primary Examiner*—Gladys J P Corcoran
(74) *Attorney, Agent, or Firm*—Rankin, Hill, Porter & Clark LLP (57) ABSTRACT

A joining pin (3.2) with which two parts (1 and 2) made from a porous material, particularly wood or a wood-like material, are to be joined together, is anchored in the porous material at predetermined anchoring points (31, 33). For this purpose, a bore (4.2) with a closed inner end (41) is made in the parts (1 and 2). The shape of this bore (4.2) is so matched to the joining pin (3.2) that it can be introduced substantially without force expenditure into the bore and is positionable in a first position. At least one predetermined anchoring point (31, 33) between the joining pin (3.2) and the wall of the bore (4.2) is formed when pressure is built up by pressing the joining pin (3.2) with a pressing force (F) more deeply into the bore to a second position. Energy is supplied in a planned manner to the joining pin (3.2) so that at the predetermined anchoring points (31, 33) the thermoplastic material of the joining pin (3.2) is plasticized. The locally plasticized plastic material is pressed by the local pressure into the porous material of the parts and forms local, macroscopic anchors (10, 20). The joining pin (3.2) is, e.g., made entirely from a thermoplastic material and the energy for plasticizing is supplied thereto by ultrasonic vibration.

14 Claims, 4 Drawing Sheets

U.S. PATENT DOCUMENTS

| | | | |
|---|---|---|---|
| 3,481,803 A | * 12/1969 | Hewitt | 156/73.5 |
| 3,612,803 A | 10/1971 | Klaas | |
| 3,733,215 A | * 5/1973 | Kessler | 427/204 |
| 3,919,775 A | 11/1975 | Malmin | |
| 4,032,803 A | 6/1977 | Durr et al. | |
| 4,100,954 A | * 7/1978 | Muller et al. | 411/23 |
| 4,130,751 A | 12/1978 | Gordon | |
| 4,248,232 A | 2/1981 | Engelbrecht et al. | |
| 4,328,108 A | 5/1982 | Deeken | |
| 4,482,795 A | 11/1984 | Hinden | |
| 4,566,138 A | 1/1986 | Lewis et al. | |
| 4,675,972 A | * 6/1987 | Bappert et al. | 29/525.12 |
| 4,717,302 A | * 1/1988 | Adams et al. | 411/378 |
| 4,761,871 A | * 8/1988 | O'Connor et al. | 29/432.1 |
| 5,004,422 A | 4/1991 | Propper | |
| 5,019,083 A | 5/1991 | Klapper et al. | |
| 5,037,442 A | 8/1991 | Wintermantel et al. | |
| 5,125,442 A | * 6/1992 | Hendrickson | 144/353 |
| 5,163,960 A | 11/1992 | Bonutti | |
| 5,167,619 A | 12/1992 | Wuchinich | |
| 5,171,148 A | 12/1992 | Wasserman et al. | |
| 5,271,785 A | 12/1993 | Devine | |
| 5,308,205 A | * 5/1994 | Lautenschlager | 411/182 |
| 5,393,559 A | 2/1995 | Shoesmith et al. | |
| 5,413,578 A | 5/1995 | Zahedi | |
| 5,426,341 A | 6/1995 | Bory et al. | |
| 5,447,592 A | 9/1995 | Berce et al. | |
| 5,547,325 A | * 8/1996 | Tucker et al. | 411/442 |
| 5,562,450 A | 10/1996 | Gieloff et al. | |
| 5,589,015 A | * 12/1996 | Fusco et al. | 156/92 |
| 5,593,425 A | 1/1997 | Bonutti et al. | |
| 5,709,823 A | 1/1998 | Hahn | |
| 5,735,875 A | 4/1998 | Bonutti et al. | |
| 5,752,831 A | 5/1998 | Padros-Fradera | |
| 5,772,359 A | 6/1998 | Marty | |
| 5,780,536 A | * 7/1998 | Yokoyama et al. | 524/439 |
| 5,785,476 A | * 7/1998 | McDonnell | 411/383 |
| 5,840,154 A | 11/1998 | Wittmaier | |
| 5,871,514 A | 2/1999 | Wiklund et al. | |
| 5,871,515 A | 2/1999 | Wiklund et al. | |
| 5,897,578 A | 4/1999 | Wiklund et al. | |
| 5,919,215 A | 7/1999 | Wiklund et al. | |
| 5,941,901 A | 8/1999 | Egan | |
| 5,964,764 A | 10/1999 | West, Jr. et al. | |
| 5,993,458 A | 11/1999 | Vaitekunas et al. | |
| 5,993,477 A | 11/1999 | Vaitekunas et al. | |
| 6,007,539 A | 12/1999 | Kirsch et al. | |
| 6,039,568 A | 3/2000 | Hinds | |
| 6,056,751 A | 5/2000 | Fenton, Jr. | |
| 6,059,817 A | 5/2000 | Bonutti et al. | |
| 6,068,482 A | 5/2000 | Snow | |
| 6,080,161 A | 6/2000 | Eaves, III et al. | |
| 6,099,313 A | 8/2000 | Dorken et al. | |
| 6,132,214 A | 10/2000 | Suhonen et al. | |
| 6,139,320 A | 10/2000 | Hahn | |
| 6,141,874 A | 11/2000 | Olsen | |
| 6,193,516 B1 | 2/2001 | Story | |
| 6,224,373 B1 | 5/2001 | Lee et al. | |
| 6,273,717 B1 | 8/2001 | Hahn et al. | |
| 6,332,885 B1 | 12/2001 | Martella | |
| 6,545,390 B1 | 4/2003 | Hahn et al. | |
| 6,592,609 B1 | 7/2003 | Bonutti | |
| 6,635,073 B2 | 10/2003 | Bonutti | |
| 2002/0044753 A1 | 4/2002 | Nagayama et al. | |
| 2002/0077662 A1 | 6/2002 | Bonutti et al. | |
| 2003/0118518 A1 | 6/2003 | Hahn et al. | |

FOREIGN PATENT DOCUMENTS

| | | |
|---|---|---|
| DE | 3045706 | 12/1980 |
| DE | 3828340 A1 | 7/1989 |
| DE | 4328108 | 8/1993 |
| DE | 19741087 | 9/1997 |
| EP | 0 269 476 A1 | 1/1988 |
| EP | 0268957 | 6/1988 |
| EP | 0269476 | 6/1988 |
| EP | 0 415 615 | 3/1991 |
| EP | 0451932 A1 | 4/1991 |
| EP | 0617935 | 10/1994 |
| EP | 1199049 | 4/2002 |
| FR | 1164445 | 1/1957 |
| FR | 1 164 445 | 10/1958 |
| FR | 1407582 | 9/1964 |
| FR | 1 495 999 | 9/1967 |
| FR | 2205402 | 11/1973 |
| FR | 2 455 502 | 11/1980 |
| GB | 762 906 | 12/1956 |
| GB | 1203305 | 4/1968 |
| GB | 2 061 183 | 5/1981 |
| GB | 2277448 | 11/1994 |
| GB | 2324470 | 10/1998 |
| JP | 52-127937 | 10/1977 |
| JP | 55-121024 | 9/1980 |
| JP | 56139918 | 10/1981 |
| JP | 61104817 | 5/1986 |
| JP | 5-245941 | 9/1993 |
| JP | 05245941 | 9/1993 |
| JP | 07222752 | 8/1995 |
| JP | 07300904 | 11/1995 |
| JP | 10323351 A1 | 12/1998 |
| WO | WO 88/03391 | 5/1988 |
| WO | WO 91/03211 | 3/1991 |
| WO | WO 94/18373 | 8/1994 |
| WO | WO 94/27558 | 12/1994 |
| WO | WO 96/01377 | 1/1996 |
| WO | WO 96/37163 | 11/1996 |
| WO | WO 01/09445 | 2/2001 |
| WO | WO 02/38070 A1 | 5/2002 |
| WO | WO 02/069817 | 9/2002 |
| WO | WO 02/087459 | 11/2002 |

OTHER PUBLICATIONS

Gladstone, Bernard, The Simon and Schuster Complete Guide Home Repair and Maintenance, Simon and Schuster, (1984). p. 45.*

English translation of Aeschlimann et al. WO 96/01377 A1.*

Patent Abstracts of Japan, Hideyuki, Fukaya, Weld Pin Adhered Resulting From Rotation Friction and Method of Adhering it, Appl. 55121024 pub. Sep. 17, 1980 (Toyota Motor Company).

Robinson, I., Linear Vibration Welding of Non Metallic Components, *Welding and Metal Fabrication*, 57 (1989) May, No. 4, Redhill, Surrey, GB, pp. 152–154.

* cited by examiner

PROCESS FOR ANCHORING CONNECTING ELEMENTS IN A MATERIAL WITH PORES OR CAVITIES AND CONNECTING ELEMENTS THEREFOR

FIELD OF THE INVENTION

This invention relates to a method of anchoring joining elements in a material having pores or cavities, particularly in wood or wood-like materials (e.g., chip-boards). The invention also relates to joining elements for use in the method. The joining elements anchored according to the method of the invention are more particularly used for producing constructions comprising different parts or for attaching fittings.

BACKGROUND OF THE INVENTION

According to the prior art, parts made from wood or woody materials are interconnected, e.g., using joining elements in the form of nails or screws which are driven through one of the parts to be joined into the other part to be joined. Screws and nails are generally made from metal and have a head in a surface area of one of the parts to be joined and are at least frictionally or positively anchored in another of the parts to be joined. These pin-like joining elements constitute in wooden structures metallic, often corrosive, foreign bodies which can be prejudicial to working after the joining of the parts and which represent heat transfer bridges in the finished structures.

It is also known to join parts made from fibrous materials, including wood and wood-like materials, to parts made from thermoplastics. The thermoplastic is plasticized at its surface facing the fibrous material part and the two surfaces are pressed onto one another. The plastic is thereby applied in plasticized form to the surface of the fibrous material or it is plasticized in the final position, e.g., by ultrasonic excitation. In all of these methods, a joint is formed at the interface between the plastic and the fibrous material in the sense of a microscopic interlocking in that the plasticized plastics material is pressed into surface irregularities of the fibrous material. Such methods are, e.g., described in FR-2 455 502, FR 1 495 999, DE-38 28 340 or EP-269476. According to WO-96/01 377, the plastics part can also be a dowel, which joins together two wooden parts. The same principle forms the basis for known methods for joining parts made from wood or wood-like materials, in which between the parts to be joined is placed a layer of a thermoplastics material, e.g., a paint layer, and the parts are then pressed together and subjected to ultrasonic action (JP 52 127 937, WO 96/01377).

In all the aforementioned methods, synthetic material and fibrous material are joined together by surface adhesion resulting from microscopic interlocking and this occurs in the same way in conventional bonding or adhesion processes. The above methods have many of the same disadvantages as bonding methods, particularly their sensitivity to moisture and thermal stresses in which the two joined-together surfaces expand to varying degrees and considerable shear forces arise which weaken or even destroy the joint.

SUMMARY OF THE INVENTION

An object of the present invention is to provide a method for anchoring joining elements, e.g., joining pins, in parts made from a material having pores or cavities, particularly in parts made from wood or wood-like materials, this method being based on the aforementioned methods for joining plastic/synthetic material and wooden parts, but in which the disadvantages thereof are at least reduced, i.e., in particular provides anchors, which are more stable under thermal and/or moisture stresses and loads. The method is simple, but still adaptable in specific ways to joining elements with different functions and to different material types. The method is also performable with known means and tools and at a limited cost.

According to the method of the invention, an anchoring plasticized synthetic material is not merely pressed into surface irregularities as in the known methods, but instead into pores or cavities within the part in which the joining element is to be anchored, so that a macroscopic anchor is formed. This macroscopic anchor is based on the penetration of the plasticized synthetic material into microscopic pores of the material and to the formation of a type of composite comprising the original porous material and the synthetic material which has penetrated it or to macroscopic interlocking, which results from the fact that the plasticized synthetic material is pressed into macroscopic cavities.

According to the method of the invention in which the joining element is to be anchored, an opening with a closed end, e.g., a bore (blind hole) is formed and then the joining element is positioned in the bore, the joining element being wholly or partly made from a thermoplastic material.

The shapes of the bore and the joining element are so matched to one another that the joining element, without force expenditure, can be introduced into the bore up to a first position and that, if it is driven with the aid of a pressing force parallel to the bore axis from the first position toward the closed end of the bore into a second, final position, pressure builds up at at least one predetermined anchoring point between the joining element and the bore wall, but no pressure arises at other points.

Simultaneously with the pressing in of the joining element from its first to its second position in the bore, or immediately prior thereto, energy is supplied to the joining element in such a way that the plastics material is locally plasticized at the aforementioned, predetermined anchoring points where the pressure is concentrated. This planned, local plasticizing can, e.g., be achieved by providing at least one of the following characteristics:

the joining element is entirely made from a thermoplastic material or at least in areas of the predetermined anchoring points has at least surface areas made from a thermoplastic material and the joining element is subjected to ultrasonic or some other appropriate vibration action for supplying energy, so that at the pressure concentration points (predetermined anchoring points) the greatest friction and therefore the maximum heat is produced and consequently the thermoplastic material is locally plasticized (related to joining methods such as ultrasonic, friction, vibration or orbital welding);

the joining element, in areas of the predetermined anchoring points, has at least surface areas of a thermoplastic material which are plasticizable at a lower temperature than the remaining materials of the joining element and in that the joining element is heated by heat supply;

the joining element, in areas of the predetermined anchoring points, has at least surface areas of a thermoplastic material, in which are incorporated metal particles and so that the joining element can be inductively heated.

In the inside of the joining element which, in the closed bore, is directed toward the closed end of he bore, the joining element has at least one first, predetermined anchoring point. On its outside end, i.e., on the end projecting from the bore or positioned in the bore opening, the joining element has a thickening serving as a head or a means for attaching a further part or has further anchoring points spaced toward the outside from the first anchoring point. It is also conceivable to have pin-like joining elements with several predetermined anchoring points.

While the joining element is pressed in the second, final position in the bore and energy is simultaneously supplied thereto, at the predetermined anchoring points where a high pressure occurs between the joining element and the bore wall, the joining element material is plasticized and as a result of the pressure at these points is pressed into the bore wall or into pores or cavities in the material which is adjacent to the bore, whereas it remains unchanged at other points.

To be sure that the plasticized synthetic material is pressed by the pressure produced at the anchoring points into the bore wall, the bore wall must be porous or have openings or cavities, or the bore wall must be created in such a way that, as a result of the pressure, formed pores or cavities are produced into which the plasticized material can be pressed. Porous materials suitable for anchors according to the method of the invention are in particular wood or wood-like materials, but also sandstone, ceramic materials, burnt brick or concrete, etc. Cavities suitable for producing anchors according to the invention open substantially transversely to the bore axis and are in particular found in lightweight structural components.

The attainable depth of the anchoring of a synthetic material in a porous material is dependent on its structure (e.g., for wood on the density of the wood fibers), but also on the pressure applied and the locally available plasticized material quantity. As will be shown hereinafter, in solid wood, e.g., anchoring depths of 1 to 4 cm are readily attainable.

The desirable depth of the anchor of the synthetic material in a porous material is dependent on the loadability of the material and can be controlled by the quantity of material to be pressed in and/or by the applied pressing force level. The shape of the anchor can be substantially controlled by suitable matching of the bore shape and the joining element shape. Thus, using the method according to the invention it is possible to produce anchors which are specifically adapted to the character of the material (e.g., wood type, orientation of the graining or density gradient relative to the orientation of the bore, etc.) in which the anchoring is to be accomplished and to the function and loading to be absorbed by the joining element.

The most advantageous bore and joining element shapes for a specific application, as well as the pressing force level and the quantity of energy to be supplied to the joining element are to be established experimentally in each specific case.

BRIEF DESCRIPTION OF THE DRAWINGS

The inventive method for anchoring joining elements in a part made from a porous material, particularly wood or a wood-like material, or a material having suitable cavities and different types of joining elements, is described in greater detail hereinafter with reference to the attached drawings, wherein.

In all of the drawings, the joining elements, bores and anchors are shown in section along the bore axis.

DETAILED DESCRIPTION OF PREFERRED EMBODIMENTS

Figure 1:
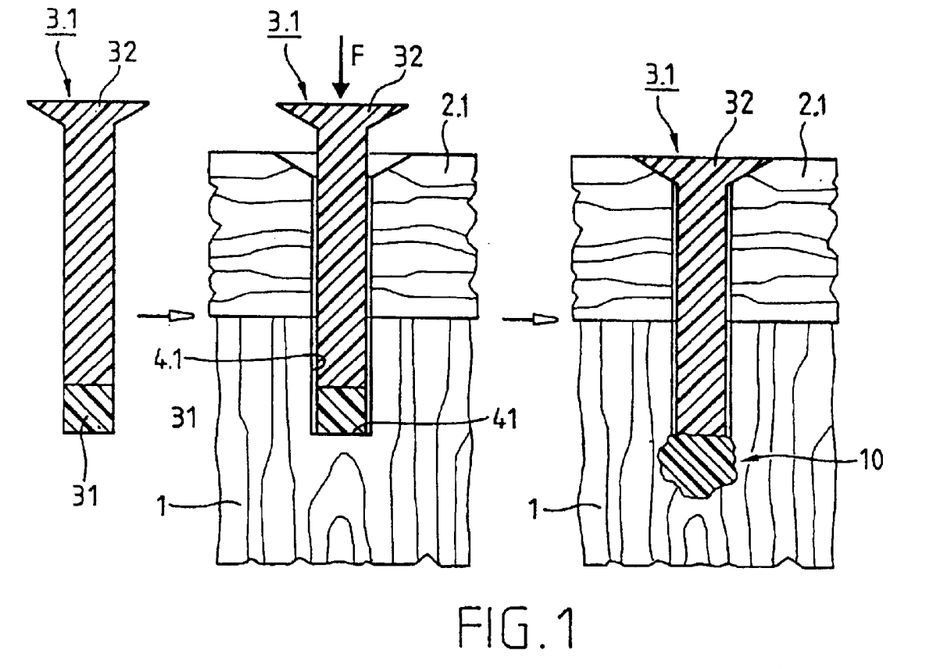
FIG. 1 is a diagram showing successive steps in one embodiment of a method for anchoring a joining pin with a head in one wooden part for joining two wooden parts.

FIG. 1 shows a first embodiment of the inventive method which involves anchoring a pin-like joining element 3.1 with a head 32 in a first, wooden part 1 for joining first part 1 to a second part 2.1, which is, e.g., also made from wood.

In the vicinity of its inner end, joining pin 3.1 has a predetermined, first anchoring point 31 and at its outer end has a head 32. Bore 4.1 passes entirely through part 2.1 and has, in part 1, a closed end 41, the total length of bore 4.1 being less deep than the length of joining pin 3.1. At the open end of bore 4.1 is, e.g., a widened depression for countersinking head 32. The cross-section of bore 4.1 is so matched to the cross-section of the joining pin 1 that, without force expenditure, the pin can be introduced into the bore up to closed end 41 thereof. This is the first position of joining pin 3.1 in bore 4.1.

From the first position, joining pin 3.1 is pressed further into bore 4.1 with a pressing force F oriented substantially parallel to the bore axis. The only point at which the pressing force F gives rise to pressure between joining pin 3.1 and the wall of the bore 4.1 is the area of closed bore end 41. If, in the above-described manner, by supplying energy to the joining pin it is ensured that during pressing in the material of the joining pin is only plasticized at this point, only at this point is there anchoring 10 of the joining pin in the part 1 to be joined.

In the drawing, anchoring location 10 is shown as a synthetic material area, but in fact is constituted by an intimate mixture of wood fibers and synthetic material, which can be likened to a composite material and which can, e.g., be of pinewood, whose graining is oriented parallel to the bore axis where it has a depth of up to 2 cm.

The length of joining pin 3.1, the depth of bore 4.1, the magnitude of force F and the quantity of energy to be supplied are so matched to one another that the anchor fulfils the desired strength conditions and that the two parts are firmly fixed together between joining pin head 32 and anchoring point 10.

Pin 3.1 of FIG. 1 is anchored in part 1 by the anchoring point 10, which is only possible in a part made from a porous material, particularly wood or a wood-like material, or, if the bore wall material has suitable cavities in the vicinity of the anchoring point or if the pressure exerted on the joining pin produces such openings in the bore wall.

Part 2.1 can also be made from wood or some other, non-porous material (metal, plastic). As shown in FIG. 1, the head 32 can be a component of the joining pin. However, the head can also be placed on the joining pin after producing the anchor, e.g., can be screwed into a thread provided in the joining pin. The head 32 can be in any random form and can, e.g., also represent a fitting with a specific function.

An advantage of joining two parts in the manner shown in FIG. 1 compared with other joining methods, in which plasticized materials are used as joining materials, is that in all cases it is possible to prevent plasticized material being pressed into the gap between the parts 1 and 2.1 to be joined, resulting in the pressing apart thereof. This is prevented by the feature that, in the region of such a gap, no pressure is built up and the material of the joining pin is not plasticized in that region.

If the energy to be supplied to the joining pin is supplied in the form of ultrasonic waves, in the manner shown, joining pin 3.1 must be made from a thermoplastic material in the area of its inner end to be positioned, as shown on the closed bore end 41. The remainder of the pin can be made from the same material or a different material, such as a thermoset plastic material.

If the energy to be supplied to joining pin 3.1 is supplied in the form of heat, in the vicinity of the anchoring point it is constituted by a plastics material which is plasticizable at a lower temperature than the material from which the joining pin is made in other areas. It is also conceivable in such a case for the joining pin to have a "core" of a heat conducting material, e.g., metal, by means of which core the heat to be supplied to the joining pin can be conducted toward the anchoring point.

If the energy to be supplied to the joining pin is supplied inductively, the thermoplastic material of the predetermined anchoring point 31 contains incorporated metal particles.

Figure 2:
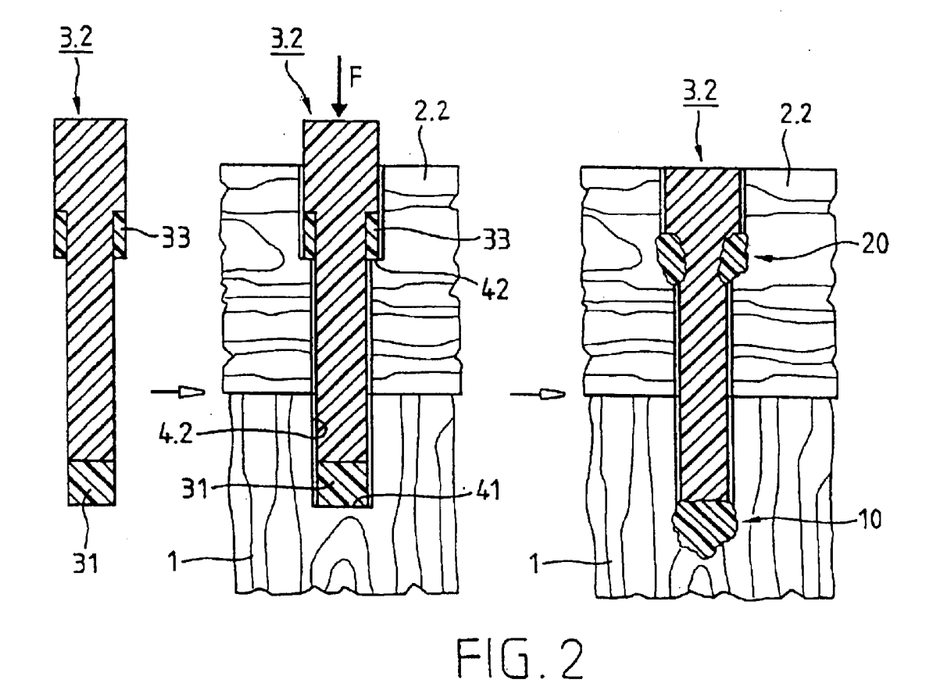
FIG. 2 is a diagram showing successive steps in another embodiment of a method for anchoring a joining pin in two wooden parts to be joined.

FIG. 2 shows a further embodiment of the inventive method using an anchor of a pin-like joining element (joining pin 3.2) in two parts 1 and 2.2 to be joined together and which are, e.g., of wood, joining pin 3.2 being anchored in both parts 1 and 2.2 (anchoring points 10 and 20).

Like joining pin 3.1 of FIG. 1, joining pin 3.2 has a predetermined, first anchoring point 31 at its inner end to be inserted in the bore. It also has a predetermined, second anchoring point 33, which is in the form of a step-like cross-sectional reduction and on the pin is positioned where it is located in the second part 2.2 to be joined.

Bore 4.2 has a cross-sectional reduction 42 corresponding to the cross-sectional reduction on joining pin 3.2 and on it rests the joining pin in its first position. If joining pin 3.2 is pressed by pressing force F more deeply into the bore 4.2, pressure builds up not only in the vicinity of closed end 41 of the bore 4.2, but also in the area of cross-sectional reduction 42, is pressed through the plastics material plasticized at this point into the wall of the bore 4.2 and consequently forms a second anchor point 20.

Bores 4.1 and 4.2 of FIGS. 1 and 2 advantageously have a circular cross-section. Joining pins 3.1 and 3.2 can also be circular. However, they can also have some other cross-section fitting into the corresponding bore. For example, in the vicinity of its smaller cross-section, joining pin 3.2 can be circular and in the area of its larger cross-section can have an angular cross-section (e.g. square) with only the areas of the edges resting on the step 42.

In both FIGS. 1 and 2 closed end 41 of the bore is shown flat and the joining pin in its first position rests with a flat face in the bore. With such a shaping of the bore and joining pin, on pressing in the pin, a substantially uniform pressure builds up over the entire face. The plasticized material is mainly driven into the wood parallel to the longitudinal axis of the joining pin, so that the cross-section of anchoring point 10 is only slightly larger than the cross-section of the joining pin.

Such a construction of the predetermined, first anchoring point is advantageous for applications in which, in the vicinity of the first anchor 10, the wood grain is oriented parallel to the bore axis and the wood of part 1 splits in the case of a limited displacement. Roughly the same effect is obtainable with a pin end tapered to a point, which in its first position rests on a roughly identically tapering bore end.

Figure 3:
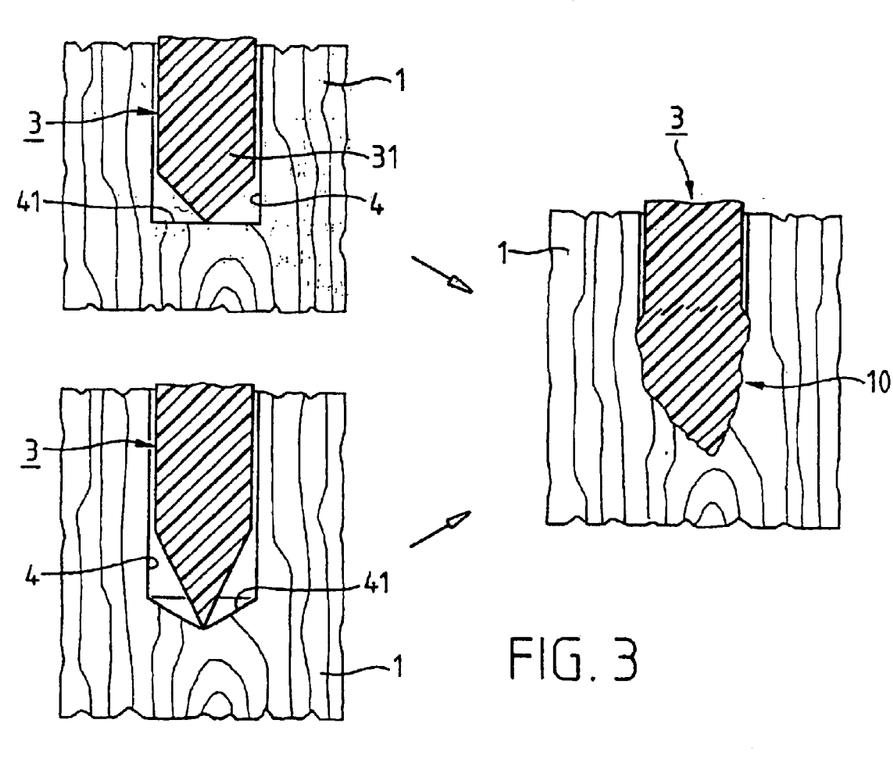
FIGS. 3, 4 and 5 are diagrams showing steps of forming three embodiments of the anchoring point in areas of the closed bore end.
Figure 4:
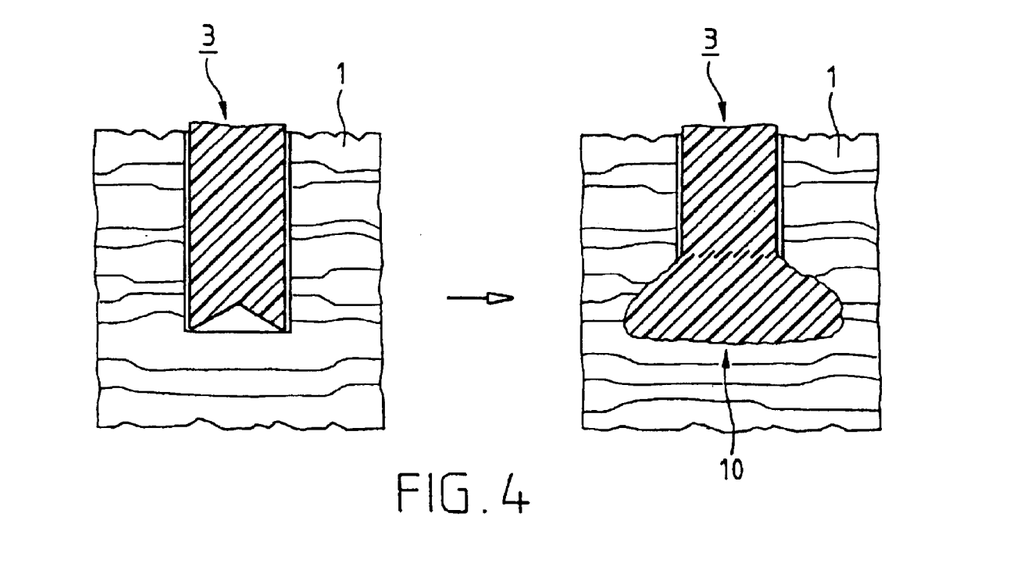
Figure 5:
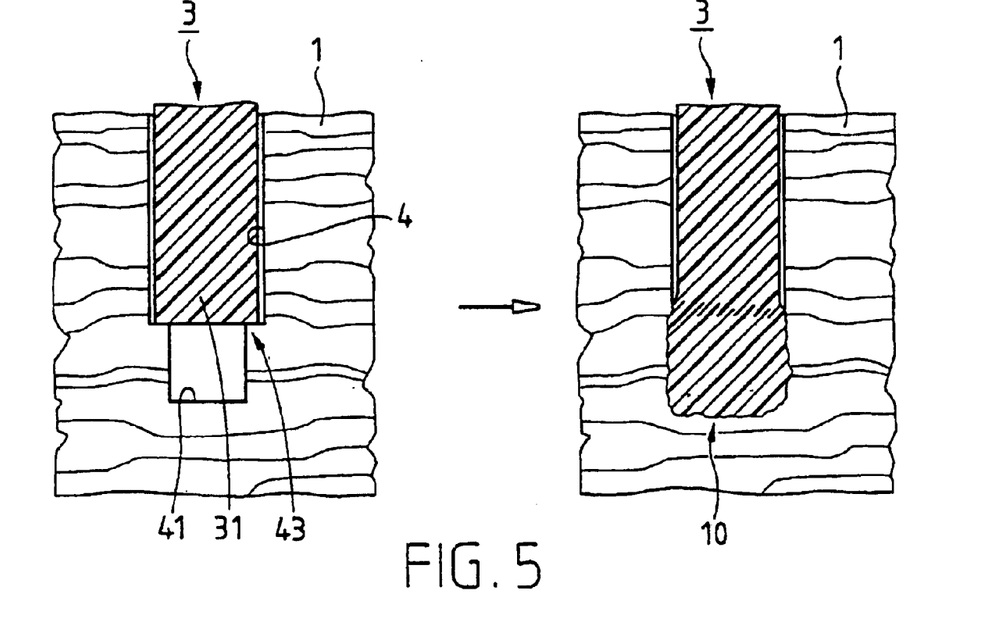

FIGS. 3 to 5 show further embodiments advantageous for specific applications of predetermined, first anchoring points 31 on, e.g., pin-like joining elements 3 and cooperating, closed ends 41 of bores 4, which particularly in the case of ultrasonic application, leads to different anchor points 10.

FIG. 3 shows two embodiments of inner ends of a joining pin 3 which is placed in a closed end of a bore 4. In both cases, the pin end is pointed, specifically more sharply than the bore end. As a result the pressure arising when pressing the joining pin 3 into the bore 4 is centrally concentrated, so that the material is, to an even greater extent, pressed parallel to the pin axis into the part 1, so that also here the resulting anchor point 10 extends more in the axial direction than at right angles thereto. The strength of such an anchor is more particularly due to an enlargement of the shear-loaded surfaces in the wood.

FIG. 4 shows one end of a pin 3 having a concave shape. When pressing this pin into a bore with a flat or pointed, closed end, the pressure mainly builds up at radial positions, which gives rise to an anchor 10, which extends to a greater extent transversely to the pin axis. Such an anchoring is more particularly suitable for a part 1 where the grain is at right angles to the pin axis, or for an anchor in a chipboard, whose surface is at right angles to the pin axis. The strength of such an anchor results more particularly from the interlocking obtained between the wooden part and the joining pin.

FIG. 5 shows another embodiment of the predetermined, first anchor point 31 on a joining pin 3 and a corresponding bore end 41. It is a first anchor point having substantially the same construction as the second anchoring point of FIG. 2. Bore 4 has a step-like cross-sectional reduction 43, on which is mounted the pin in its first position. When this joining pin is pressed into the bore, more particularly a pressure is built up radially in the vicinity of the bore end and the plasticized material is pressed into the wood more particularly transversely to the pin axis.

Figure 6:
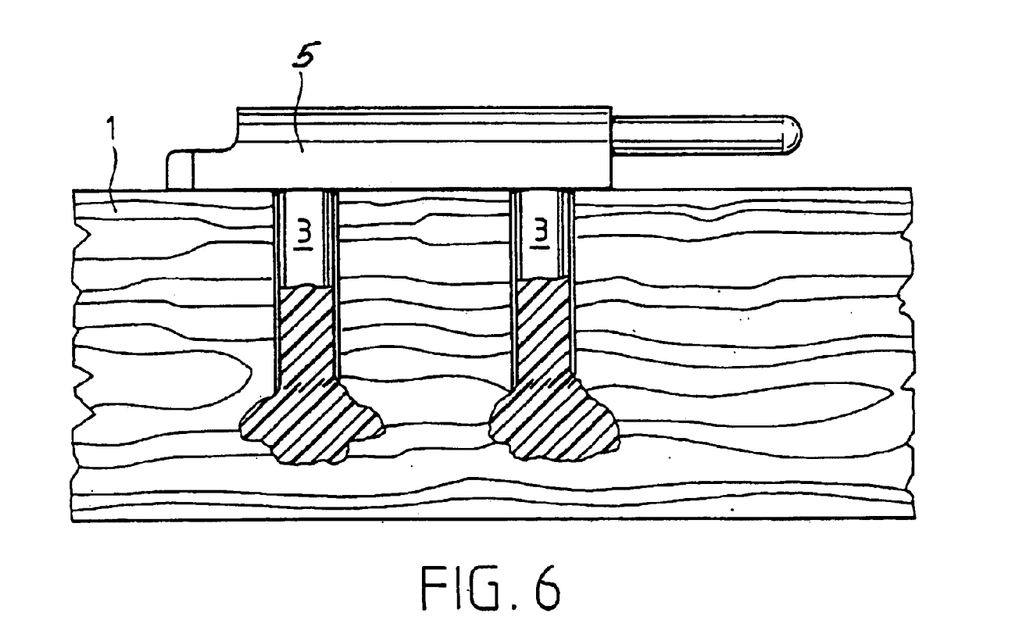
FIG. 6 is a side elevation of a fitting, which is attached to a wooden part using a plurality of joining pins anchored in the wooden part.

FIG. 6 shows a part 5 made from a random material, which is fixed to a part 1 using pin-like joining elements 3 which are anchored in part 1 which is, e.g., made from wood and in accordance with the method of the invention. Part 5 is a fitting (e.g. a hinge part), e.g., made from plastic. Two joining pins 3 are formed onto part 5 or are joined thereto in some other appropriate way and are driven in the described way into bores of part 1 and anchored therein. Here again, as mentioned in conjunction with FIG. 1 concerning a joining pin head, part 5 can have a random shape and, even after producing the anchor, can be appropriately mounted on joining pin or pins 3.

Figure 7:
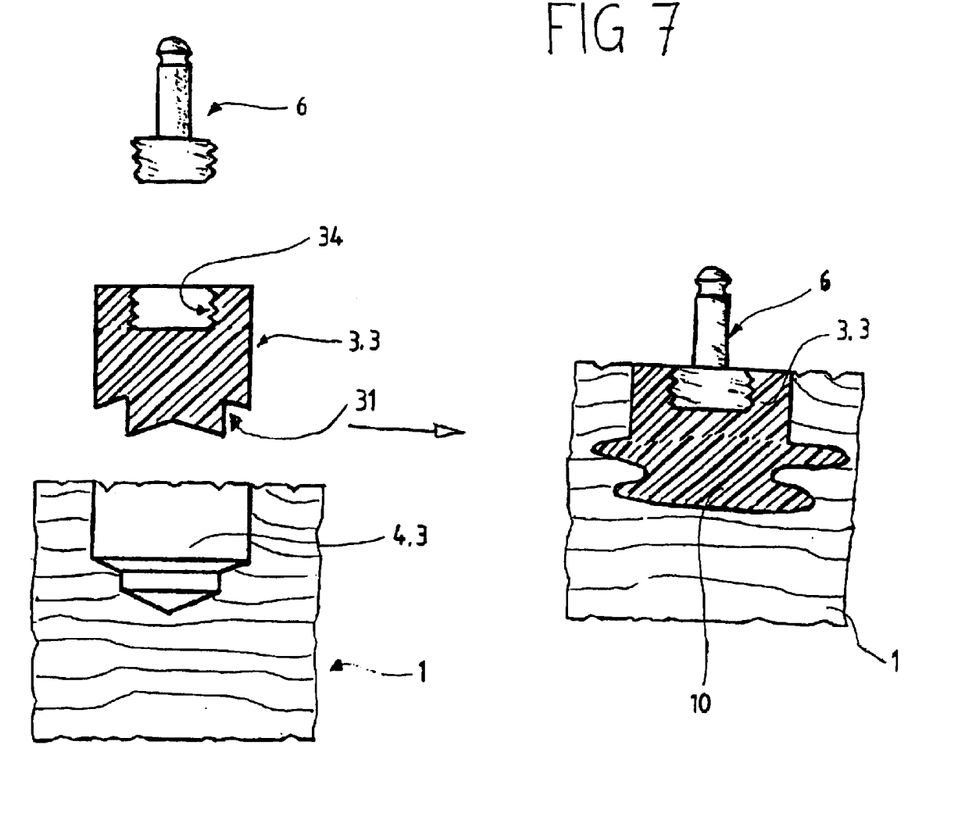
FIG. 7 is a sectional side elevation of a method for anchoring a joining element which has an internal thread for attaching further parts.

FIG. 7 shows the production of a connection of a wooden part 1 with a fitting part 6, e.g., made from metal, by means of an inventive anchor of a joining element 3.3 in part 1 and the attachment of fitting part 6 to the anchored joining element 3.3. Joining element 3.3 has a two-step, first anchoring point 31 and is introduced into a bore 4.3 with a step-like, narrowing base. On pressing the joining element into the bore and during the simultaneous plasticizing of the anchoring point 31, bore 4.3 and joining element 3.3 act as explained in conjunction with FIG. 4. A mating "two-step" anchor 10 is formed.

Joining element 3.3 of FIG. 7 has at its outside, facing the predetermined anchoring point, as the means for fixing a further part, an internal thread 34, into which is screwed fitting part 6 after anchoring the joining element 3.3 in part 1.

Figure 8:
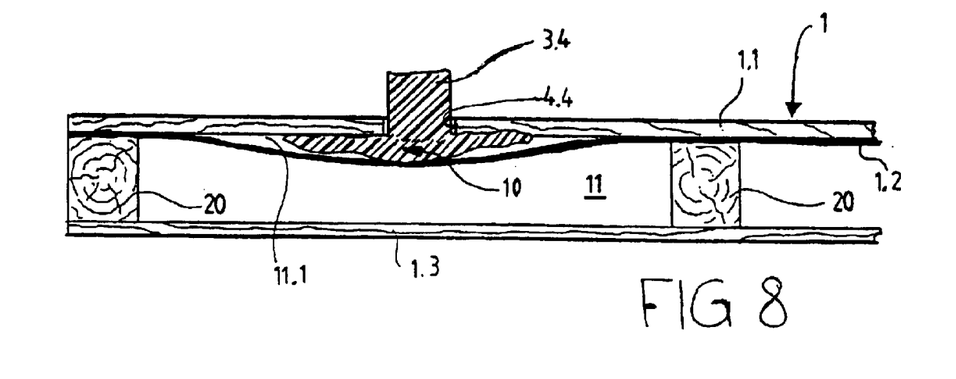
FIG. 8 is a sectional side elevation of an anchor according to the invention anchored in a lightweight component with cavities.

FIG. 8 shows the result of a further embodiment of the inventive method, namely an anchor of a joining element 3.4 in a part 1, which is a lightweight constructional component with cavities 11. The closed bore necessary for the method according to the invention and into which is introduced the joining element 3.4. is in this case a through-bore 4.4 through one of the outer layers 1.1 of part 1. This through-bore 4.4 is closed by a further element, e.g., by an inner layer 1.2 or optionally by the facing, outer layer 1.3, in such a way that between through-bore 4.4 and the element closing it opens a cavity area 11.1 extending substantially at right angles to the bore axis or is produced by the pressure of joining element 3.4 on the bore-closing element, e.g., by a corresponding deformation of inner layer 1.2.

Joining element 3.4 is inserted in bore 4.4 and is positioned by the bore-closing element (e.g. inner layer 1.2). Joining element 3.4 is then pressed against the bore-closing element and simultaneously the plastics material is plasticized in the area of this element and is pressed into the cavity area 11.1, existing or produced between the outer layer 1.1 and the bore-closing element, so that a macroscopic anchor 10 is obtained.

As has been stated, the method according to FIG. 8 is particularly suitable for light-weight construction applications where, in place of solid material, use is made of thin, board-like material carried by a support structure (indicated by the two laths 20). Outer layers 1.1 and 1.3 are, e.g., thin, solid wood boards or coated chipboards. The element closing bore 4.4 can, e.g., be a plastic or metal inner layer 1.2 extending from a lath 20 to a neighboring lath 20 or over the entire surface of the first layer, or can be a differently shaped element locally and specifically integrated for this purpose into cavity 11.

Joining element 3.4 according to FIG. 8 is, e.g., suitable for attaching fittings to lightweight structural components.

Thermoplastic materials for use in joining elements advantageously have a high mechanical strength, particularly a high tensile strength and a high modulus of elasticity. Polyamides, polycarbonates or polyester carbonates are particularly suitable. For increasing the strength, the plastics material of a joining element can, e.g., also contain glass or carbon fibers. Further thermoplastics materials suitable for use as joining elements are acrylonitrile butadiene-styrene, styrene-acrylonitrile, polymethylmethacrylate, polyvinyl chloride, polyethylene, polypropylene and polystyrene.

A joining pin for joining two wooden parts, as shown in FIG. 2, e.g., has the form shown in FIG. 2 and is made entirely from acrylonitrile butadiene-styrene. It has a smaller portion with a circular cross-section of a diameter of 8 mm and a larger portion having a circular cross-section with a diameter of 10 mm. It is 60 mm long and is centrally provided with the cross-sectional reduction. The mating bore is 40 mm deep and has the step positioned to correspond to the cross-sectional reduction of the pin at a height of 30 mm. The pin is inserted in the bore and is pressed into it for 5 sec. with a pressing force of 2000 N and ultrasonic excitation with an amplitude of approximately 44 µm. Upon completion of the assembly, the outer pin end is flush with the wood surface.

What is claimed is:

1. A method for anchoring a joining element in a part consisting of porous material, the joining element having a distal end and a proximal end and including a thermoplastic material at least at said distal end, the method comprising the steps of:

forming a bore in the part, the bore having an inner closed end and being matched to the shape and dimensions of the joining element so that the joining element can be positioned in the bore with substantially no force and with the distal end of the inserted joining element disposed against the inner closed end of the bore, inserting the joining element in the bore such that the distal end of the joining element is disposed against the inner closed end of the bore, applying pressure to the proximal end of the joining element to force the joining element deeper into the bore, the pressure being applied substantially along a central axis of the bore and producing an increase of pressure of the distal end of the joining element against the inner closed end of the bore, during the application of pressure, applying vibration energy to the joining element to cause the thermoplastic to plasticize at the distal end of the joining element, the pressure causing the plasticized thermoplastic material to flow into pores of the part beyond the inner closed end of the bore in the axial direction of the bore, thereby forming a macroscopic anchoring connection between the part and the distal end of the joining element.

2. A method according to claim 1 including joining a second part made of a porous material to the first mentioned part with the joining element, wherein the joining element is a joining pin having a reduction in diameter intermediate the ends thereof forming a first shoulder, wherein the step of forming a bore includes forming a portion of the bore through the second part and into the first part to the inner closed end, the bore in the second part having a reduction in diameter forming a second shoulder matching the first shoulder of the joining pin, and the step of positioning includes inserting the joining pin into the first and second parts so that the first and second shoulders are in contact with each other, the contacting first and second shoulders forming a second macroscopic connection between the second part and the joining element.

3. A method according to claim 1 including joining a second part made of a porous material to the first mentioned part with the joining element, wherein the joining element is a joining pin, wherein the step of forming a bore includes forming a portion of the bore through the second part and into the first part to an inner closed end, and wherein the joining pin has an enlarged head portion on the proximal end thereof.

4. A method according to claim 1 including fixedly attaching the joining element to a second part.

5. A method according to claim 4 wherein the step of fixedly attaching is performed after positioning the joining element in the bore.

6. A method according to claim 5, wherein for fixedly attaching the second part, the joining element comprises at its proximal end an internally threaded opening for receiving an attachment of the second part.

7. A method according to claim 1 wherein the step of applying vibration energy includes ultrasonically exciting the joining element to cause the thermoplastic to plasticize.

8. A method according to claim 1 wherein the joining element consists entirely of thermoplastic material capable of being plasticized.

9. A method according to claim 1 wherein the part comprises wood or a woodlike material.

10. A method according to claim 1 wherein the part comprises at least one of sandstone, porous ceramic, burnt brick or concrete.

11. A method according to claim 1, wherein the distal end of the joining element is shaped with a point.

12. A method according to claim 1, wherein the distal end of the joining element is flat or concave.

13. A method according to claim 1, wherein the thermoplastic material is selected from the group consisting of polyamide, polycarbonate, polyester carbonate, acrylonitrile-butadiene-styrene, styrene-acrylonitrile, polymethylacrylate, polyvinyl chloride, polyethylene, polypropylene and polystyrene.

14. A method according to claim 1, wherein the joining element further comprises another material that is different from the thermoplastic material.

* * * * *